Figure 1:
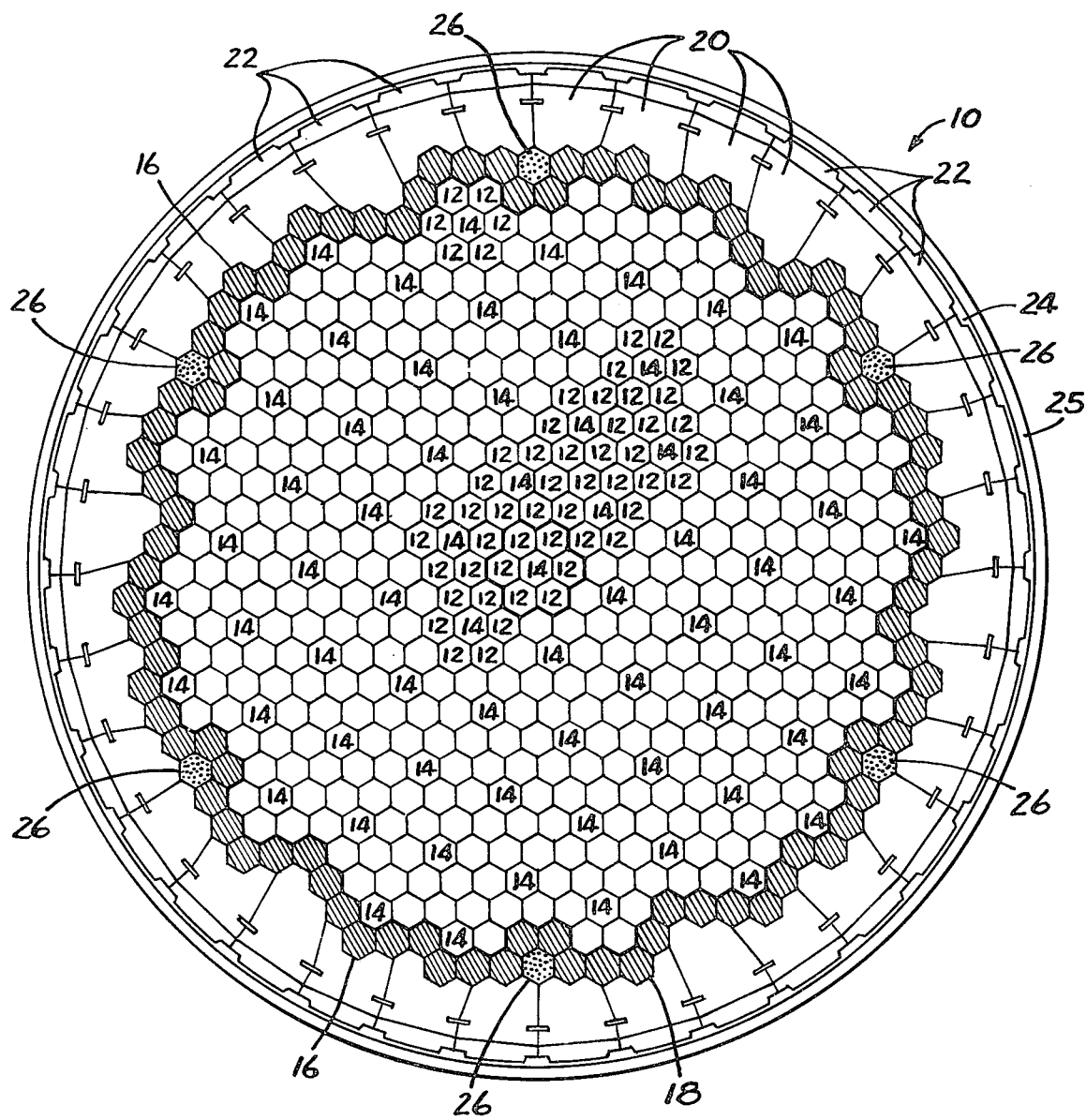

United States Patent [19]

Mysels

[11] 4,040,902
[45] Aug. 9, 1977

[54] METHOD FOR AXIALLY SHUFFLING FUEL ELEMENTS IN A NUCLEAR REACTOR

[75] Inventor: Karol J. Mysels, La Jolla, Calif.

[73] Assignee: General Atomic Company, San Diego, Calif.

[21] Appl. No.: 564,773

[22] Filed: Apr. 3, 1975

[51] Int. Cl.² .............................................. G21C 19/00
[52] U.S. Cl. ......................................... 176/30; 176/84
[58] Field of Search ....................... 176/30, 31, 32, 50, 176/61, 84, 77

[56] References Cited

U.S. PATENT DOCUMENTS 3,607,643  9/1971  Paget ..................................... 176/84

FOREIGN PATENT DOCUMENTS 634,800    1/1962   Canada ................................... 176/30
974,248    11/1964  United Kingdom ................... 176/30
952,558    4/1964   United Kingdom ................... 176/30
1,126,322  9/1968   United Kingdom ................... 176/30

Primary Examiner—Samuel W. Engle
Assistant Examiner—S. A. Cangialosi
Attorney, Agent, or Firm—Fitch, Even, Tabin & Luedeka

[57] ABSTRACT

A method for axially shuffling fuel elements in a nuclear reactor is disclosed wherein column vacancies are created in a manner to allow substantially lateral transfer of a selected number of fuel elements from another adjacent column to a vacated column, the remaining fuel elements of the partially transferred column are removed and discarded whereby to create a new column vacancy, fresh fuel elements are added to the transferred fuel elements to establish a full new column of fuel elements and continuing such shuffling throughout the entire active core of the reactor.

10 Claims, 6 Drawing Figures

METHOD FOR AXIALLY SHUFFLING FUEL ELEMENTS IN A NUCLEAR REACTOR

The present invention relates generally to nuclear reactors, and more particularly to a novel method of refueling the active core of a high temperature gas-cooled nuclear reactor wherein the active core includes a plurality of columns of fuel elements or blocks. In accordance with the preferred embodiment of the present invention, the lower layers of fuel elements are removed and fresh fuel elements are added to comprise the upper layers of the columns without totally axially removing the fuel columns, and through access from the top of the reactor.

The present invention finds particular application in the reshuffling of fuel elements in a high temperature gas-cooled reactor wherein the reactor core includes a plurality of columns of stacked modular fuel elements. For such a reactor design, it has been found that by programming the fuel elements of varying degrees of burn-up at specified axial locations within their respective columns, a stable and desirable axial power shape, accompanied by high outlet gas temperature, can be obtained.

A conventional practice in refueling the active cores of high temperature gas-cooled reactors having fuel columns comprised of stacked fuel elements has been to provide a central bore within each element which extends downwardly into the element. An undercut is provided near the bottom of the bore to allow manipulation of a mechanical mechanism which is inserted downwardly within the bore. The mechanism is manipulatable in a manner to remove fuel elements one at a time from the column and new fresh fuel elements are added by reversing the process. The difficulties and expense of refueling the active core of a nuclear reactor in this manner are well known.

To reduce time and expense of refueling it is therefore customary not to distrub any fuel elements that need not be removed from the reactor. Hence refueling is done by "patches" i.e. groups of columns. All the fuel elements of a series of patches are removed and replaced during refueling whereas other patches remain undisturbed during that refueling period but are in turn replaced during later refuelings. Since patches of different age fuel have different power densities, the coolant flow to each patch has to be regulated by flow constrictors.

Recent developments in systems for refueling nuclear reactors, and particularly developments in method for refueling high temperature gas-cooled reactors, have introduced the concept of "axial push-through". The term "axial push-through", as used herein, denotes a system or method of refueling the active core of a nuclear reactor in which the end result is the addition of fresh fuel elements to form the upper fuel element layer or layers of a multi-layer active core, and the removal of one or more of the lower fuel elements of each column as spent fuel. For example, in an eight-layer active core, the two lower layers of fuel elements may be removed and two fresh fuel elements added to form the top two layers of the newly constituted eight-layer core.

More generally, "axial-shuffling" denotes any axial rearrangement of fuel elements during refueling.

A primary object of the present invention is to provide a novel method for axial shuffling and axial push-through of the fuel elements of the active core of a high temperature gas-cooled nuclear reactor.

Another object of the present invention is to provide a novel method for axial push-through of the fuel elements of the active core of a nuclear reactor, and particularly a high temperature gas-cooled nuclear reactor, having a plurality of columns of fuel elements, which method includes the steps of initially creating column vacancies, transferring selected upper fuel elements from a neighboring column substantially laterally into a previously created column vacancy, removing from the bottom of the reactor core the remaining lower fuel elements from the transferor column as spent fuel elements thereby creating a new column vacancy, adding fresh fuel elements on top of the fuel elements transferred to the neighboring vacant column to provide a full complement of fuel elements in the new column, and continuing fuel element shuffling in this manner throughout the active core of the reactor, whereafter the finally created column vacancies are refilled with fuel elements.

As used herein, the term "substantially laterally" means to move one or more fuel elements without lifting or lowering them significantly beyond the upper or lower bounds of the active core but includes in particular lifting by a small distance to disengage the elements being moved from supporting structures and lowering (or raising) a small distance beyond the new position in the vacant column.

For example, in a nuclear reactor having an active core which includes a substantial number of columns each of which includes eight fuel elements, the fuel elements of three adjacent columns are completely removed to create three adjacent column vacancies. The lower two fuel elements of each stack of elements removed to create the column vacancies are discarded. The top six fuel elements of a column adjoining or neighboring a vacant column are then moved substantially laterally into the adjacent column vacancy. The remaining two bottom fuel elements from the transferred column are removed and discarded. Two fresh fuel elements are stacked on top of the transferred six fuel elements to create a full complement of fuel elements in the new column. A new column vacancy is created by each transfer of the upper six fuel elements and removal of the bottom two fuel elements of an existing column. This process of creating column vacancies, laterally transferring upper fuel elements from a neighboring column, removing the lower two fuel elements from the transferor column, and adding two fresh fuel elements to the transferred fuel elements is continued throughout the active core of the reactor. By having three column vacancies at all times, the pattern can sweep substantially any desired core area whereafter the three column vacancies remaining are refilled with fuel elements which may be 18 of those removed to create the original three vacancies and two fresh elements per column.

The method of axially shuffling fuel elements within a nuclear reactor in accordance with the present invention permits its application within other known constraints of operating and constructing a high temperature gas-cooled reactor (HTGR) such as height of the plenum between upper reflectors and the liner, size of the reactor vessel, size and number of refueling openings, refueling down-time, non-criticality of the core during refueling, etc. The advantages of axial push-through are numerous: It increases the efficiency of the HTGR by permitting lowering of the fuel temperature by upwards of 300° F. Higher helium outlet temperatures can be obtained. It eliminates the need for adjustable flow constrictors. The core power density can be increased without endangering the fuel integrity. By increasing the core density, a reduction in core size can be obtained for a desired core power, with a reduction in the number of fuel elements required. Because of the asymmetic axial grading of the fissile content, a quasiexponential axial power shape can be maintained throughout the in-core residence time of the fuel elements. The fuel elements experience decreasing fast flux as they are moved downwardly toward the bottom of their respective columns, with a new reduction in fast fluence exposure for a given in-core residence time. The method of the present invention requires less down-time to execute than is required by other proposed schemes of axial push-through.

Figure 2A:
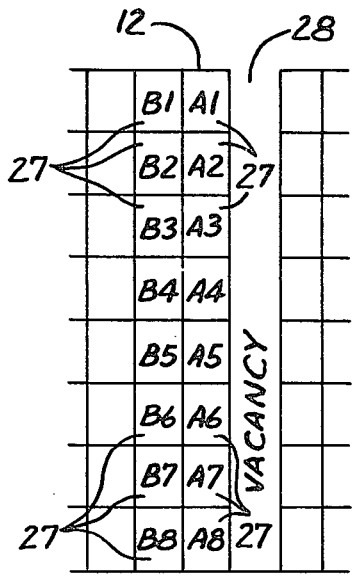
Figure 2B:
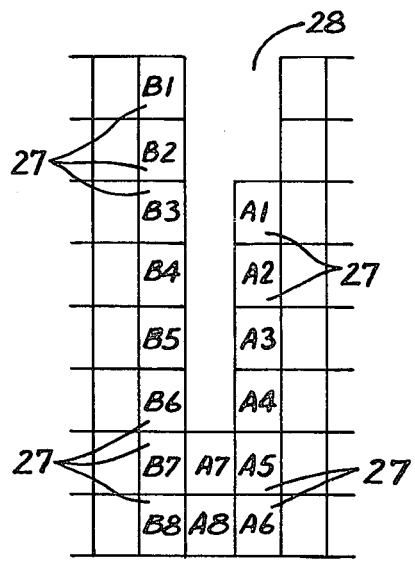
Figure 2C:
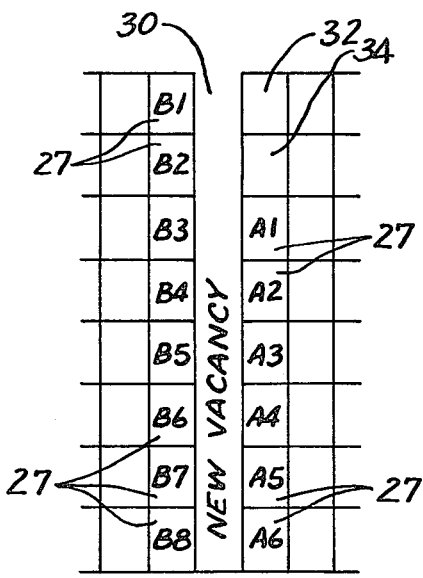
Figure 2D:
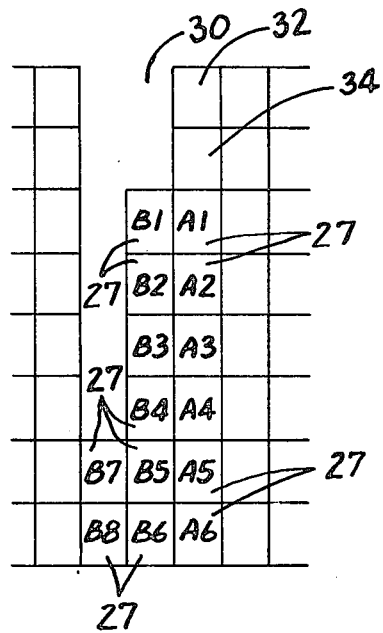
Figure 3:
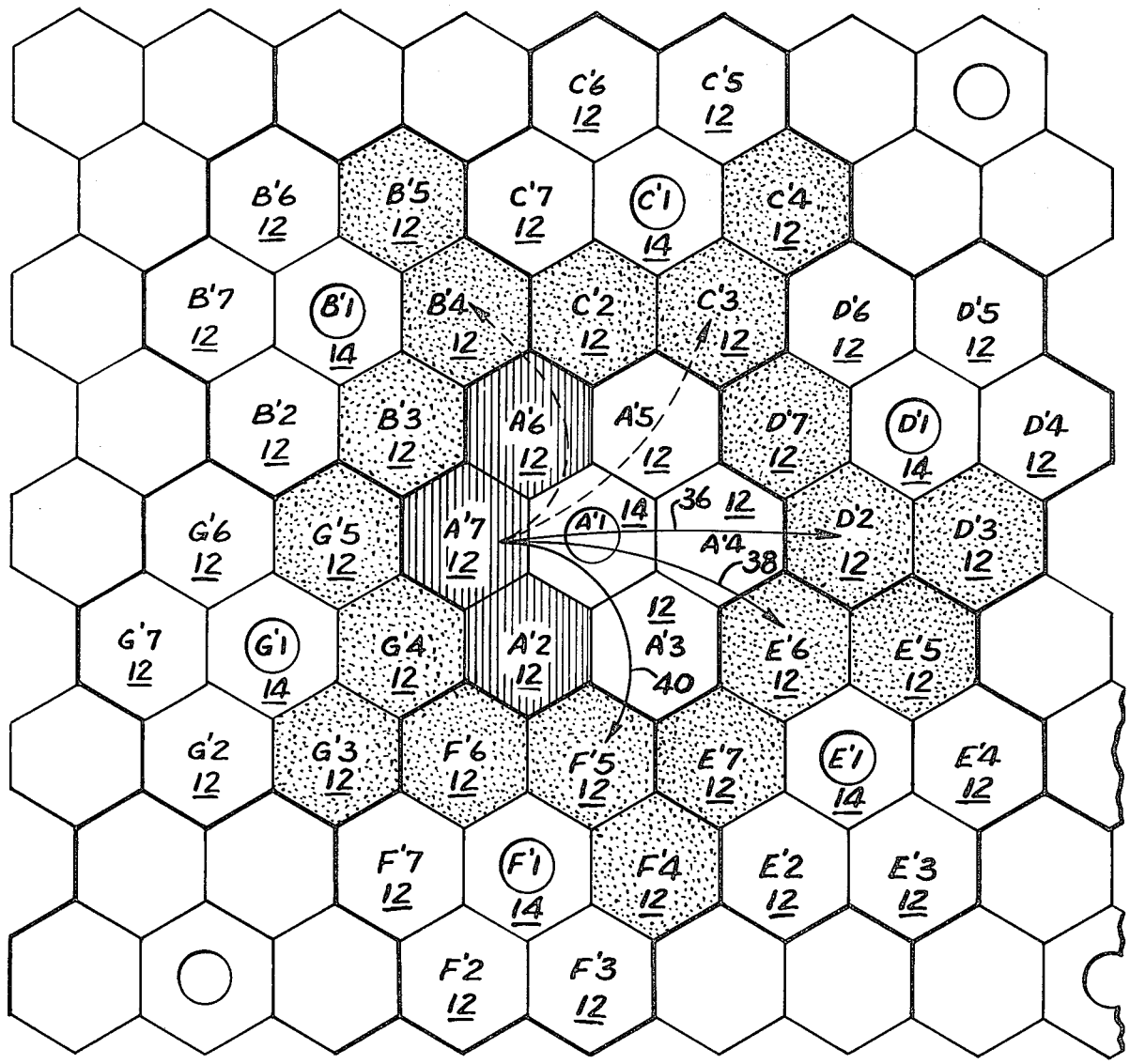

Further objects and advantages of the present invention, together with the organization and manner of operation thereof will become apparent from the following detailed description of the invention when taken in conjunction with the accompanying drawings, wherein like reference numerals designate like elements throughout the several views, and wherein:

FIG. 1 is a transverse horizontal sectional view of the active core of a high temperature gas-cooled reactor of the type with which the present invention finds application;

FIGS. 2a, 2b, 2c and 2d schematically illustrate, in partial longitudinal vertical section, a portion of the columns of the reactor core of FIG. 1 for purposes of explaining the method of shuffling the fuel elements in accordance with the present invention; and FIG. 3 is a partial plan view depicting a portion of the reactor core of FIG. 1 for purposes of illustrating the method of refueling the reactor core in accordance with the present invention.

As noted above, the term "axial push-through", as used herein, denotes a method or system of refueling the active core of a nuclear reactor, and particularly a high temperature gas-cooled reactor (HTGR), in which fresh fuel elements are added to core columns to form the upper fuel elements layers of a multi-layer active core, and the bottom fuel elements of each column are removed as spent fuel. Thus, during the lifetime of a fuel element, it progressively moves from a position within the upper layers of a core column to the bottom layers whereafter it is removed as spent fuel.

FIG. 1 shows a transverse cross section of a nuclear reactor core, indicated generally at 10. The active core of the reactor 10 includes a plurality of fuel columns 12. In the illustrated embodiment of the reactor core 10, 402 "standard" fuel columns 12 are provided each of which has a regular hexagonal transverse cross sectional configuration, although other suitable shapes may be employed. The active core portion of the reactor core 10 also includes a plurality of hexagonal shaped control rod fuel columns 14. The fuel columns 12 and control rod fuel columns 14 are arranged throughout the reactor core 10 such that, in the majority, each control rod fuel column is surrounded by six fuel columns, with each of the surrounding fuel columns 12 having a peripheral surface segment, i.e. one side surface segment of its hexagonal peripheral surface, in contacting relation with a peripheral surface segment of the associated centered control rod fuel column 14. In the illustrated embodiment, seventy three control rod fuel columns 14 are provided so that the total number of columns is 475.

The reactor core 10 includes an active core reflector zone 16 of conventional construction which extends about the periphery of the assembled fuel columns 12 and control rod fuel columns 14. The outer periphery of the reflector zone 16 is peripherally surrounded by a periodically replaced reflector zone comprised of 90 hexagonal shaped columns 18 (shown cross-hatched). Backing up the reflector zone columns 18 are a plurality of permanent reflector zone blocks 20 which extend the full periphery of the reflector zone 18 and are retained in side-by-side relation in a conventional manner. Spacer blocks 22 are interposed between the outer surface of each of the permanent reflector zone blocks 20 and a peripherally extending thermal barrier 24. The thermal barrier 24 is, in turn, retained in place by a suitable cylindrically shaped reactor vessel liner 25. A prestressed concrete reactor vessel wall (not shown) or other suitable vessel wall is provided about the liner 25 in a known manner. Permanent hexagonal shaped reflector columns 26 (shown dotted in FIG. 1) of known construction are equidistantly circumferentially spaced about the fuel columns 12 and associated control rod fuel columns 14 as shown in FIG. 1, there being six such reflector columns 26 employed in the reactor core 10.

Each of the fuel columns 12 includes eight fuel elements or blocks 27 of equal size and shape which are stacked to form eight layers of modular fuel elements, as shown schematically in FIGS. 2a-2d. The fuel elements 27, which may be alternatively termed fuel blocks, are of known design and may, for example, be constructed in accordance with the disclosure of U.S. Pat. No. 3,413,196, dated Nov. 26, 1968.

The control rod fuel columns 14 comprise rod blocks which are of substantially the same size and configuration as the fuel elements or blocks 27 and are stacked in layers of eight blocks similar to the fuel columns 12. The rod blocks comprising the control rod fuel columns 14 are provided with control rod holes (not shown) which extend completely therethrough and thus provide vertical channels in which cylindrical control rods (not shown) may be disposed in a known manner. In the present embodiment the control rod fuel columns 14 differ from the fuel columns 12, although this may be avoided in other designs. During shuffling of the fuel elements 27 in carrying out the method of refueling in accordance with the present invention, the top six rod blocks of a control rod column must be moved into a "parking" position while the bottom two blocks from the rod column are removed, whereafter the top six blocks are moved back and lowered into their original column position. The tables set forth hereinbelow, which list an order of fuel element shuffling in carrying out the present invention, take such requirements for the control rod columns into considertion.

With particular reference to FIG. 2a, a column 12 of fuel elements 27 is designated as column "A" and has its eight fuel elements designated as A1-A8. As shown, the fuel elements A1-A8 are disposed in vertically stacked relation which is representative of the fuel columns 12 employed in the active core of the nuclear reactor 10. The method of axial push-through of the fuel columns 12 and control rod fuel columns 14 in accordance with the present invention, such that each fuel element is progressively moved from an upper position or layer in the core of the reactor to a lowermost position whereafter it is removed as spent fuel, can best be illustrated with reference to FIGS. 2a-d.

FIG. 2a depicts the creation of a column vacancy, indicated at 28, wherein all eight fuel elements of the column have been totally removed. In practice, three adjacent column vacancies are created as the first step in the method of shuffling fuel elements in accordance with the present invention. Three such adjacent column vacancies are represented in FIG. 3 at 28a, 28b and 28c.

After creating three adjacent column vacancies, the top six fuel elements A1-A6 of a fuel column 12 adjacent one of the column vacancies 28 are moved substantially laterally by being lifted together a few inches, moved sideways and then lowered into the selected vacant column to comprise the lower six fuel elements of the new fuel column created in the selected vacant column. This transfer of the top fuel elements A1-A6 from the adjacent column into the selected vacated column 28 exposes the lower two fuel elements A7 and A8. The fuel elements A7 and A8 are then removed from their column through the top or upper end of the reator core as spent fuel elements. A new column vacancy is thus created in the column space previously occupied by the now transferred and removed fuel elements, the new column vacancy being indicated at 30 in FIG. 2c.

Following transfer of the top six fuel elements A1-A6 into the previously vacated column 28 and removal of the lower two fuel elements A7 and A8 from the transfer column to create the new column vacancy 30, two fresh fuel elements, indicated at 32 and 34 in FIG. 2c, are added to the upper end of the stack of transferred fuel elements A1-A6 to provide a full complement of eight fuel elements within the new fuel column created in the initially vacated fuel column 28.

FIG. 2d schematically illustrates the next step of shuffling fuel elements 27 into the newly created column vacancy 30 from a fuel column adjacent vacant column 30. As shown in FIG. 2d, the upper six fuel elements, designated B1-B6, adjacent vacant column 30 are transferred substantially laterally into vacant column 30 and lowered to the bottom of vacant column 30. The lower two exposed fuel elements B7 and B8 are then removed through the upper end of the reactor core as spent fuel elements. Two fresh fuel elements 27 are then placed in stacked relation onto the transferred fuel elements B1-B6 to establish a full complement of fuel elements in the fuel column created in previously vacated column 30.

As thus far described, it can be seen that in accordance with the present invention, a selected number of fuel columns, such as three, are removed in their entireties to create adjacent column vacancies. The top six fuel elements of a neighboring eight-layer column of fuel elements are then lifted together a short distance, such as a few inches, and moved laterally and lowered into a selected one of the neighboring vacant columns. Two fresh fuel elements are then deposited on top of the six transferred fuel elements to effect top layer refueling of this column of fuel elements. The two fuel elements remaining at the bottom of the transferor column are then removed as spent fuel elements through the upper end of the reactor. Removal of the two lower fuel elements restores a column vacancy so that this process can continue for another neighboring column. By repetition of this procedure, the whole active core of the reactor may be refueled. It will be appreciated that the steps of adding new or fresh fuel elements to the laterally transferred fuel elements, and removing the two lowermost spent fuel elements from the transferor column, need not be performed in a particular order.

Strictly speaking, the above description describes a method of "downward axial push-through". It is equally applicable, however, to other axial shufflings. Thus, the fresh fuel elements may be first deposited in a vacant column, the fuel elements to be discarded from an adjacent column may be removed from the top of the adjacent column, and the lower six fuel elements transferred from the adjacent transferor column to the top of the two fresh fuel elements deposited in the bottom of the transferree column. Under the latter procedure, "upward axial push-through" is realized, with the fuel elements or blocks effectively moving upward during their useful lives. If neighboring column vacancies are filled, one according to the "downward" scheme and the other according to the "upward" scheme, then "counter-current axial push-through" is effected. Other schemes of fuel elements shuffling within the scope of the invention are possible such as replacement of fuel elements at both ends of a column or in the middle of a column.

As disclosed in the above-referenced U.S. Pat. No. 3,413,196, both the fuel elements 27 comprising the fuel columns 12 and the rod blocks comprising the control rod columns 14 are preferably provided with upstanding tubular pins (not shown) in their upper surfaces which may be aligned with deeper holes in the fuel elements and rod blocks, leaving vertical clearances which provide gripping places for handling the fuel elements and rod blocks by a suitable fuel element handling machine. Alternatively, it may be desirable to provide a single central bore or coolant hole in each fuel element and rod block to allow insertion of a grapple mechanism. Refueling of a nuclear reactor in accordance with the present invention is most readily facilitated when the fuel elements and rod blocks have central holes or bores which extend through the fuel elements and rod blocks so that a grapple can pass through the desired number of fuel elements or rod blocks, such as six, to reach the lowest block of the group to be transferred. Movement of the fuel elements and rod blocks may be effected by one or more machines which, per se, do not form part of the present invention.

As noted, simple lateral shuffling of the fuel columns 12 as above described is not always possible. In the active core illustrated in the reactor 10 in FIG. 1, the control rod fuel columns 14 are not interchangeable with the fuel columns 12. It is therefore necessary that the top six rod blocks of a control rod fuel column 14 be moved into a "parking" position while the bottom two rod blocks of the column are removed, whereafter the initially removed upper six fuel rod blocks are lowered back into their original column. Such shuffling of the rod blocks of the control rod fuel columns 14 assumes that the terminations of the control rod and shutoff holes, which are provided in the rod blocks, occurs in the first bottom reflector block.

Another factor which may require deviation from the above described simple lateral transfer or shuffling of fuel elements is that each fuel element is conventionally covered by two top reflector blocks which have to be handled separately since the new or fresh fuel elements must be inserted below the reflector blocks. In accordance with the below set forth shuffling scheme, the reflector blocks are shuffled into reflector vacancies. Only the rod block reflectors, i.e., the reflectors disposed on the upper ends of the control rod fuel column 14, must be "parked" and then replaced.

FIG. 3 partially schematically illustrates a transverse section of the active core of the nuclear reactor 10, and designates different fuel regions at A', B', C', D', E', F' and G'. It will be noted that each of these fuel regions comprises six fuel columns 12 surrounding a central control rod column 14. The remaining portion of the active core of reactor 10 can similarly be divided into specific fuel regions designated by reference symbols, such as primed capital letters. The following Tables I, II and III list in table form the shuffling movements which permit shuffling of the fuel elements in one fuel region along with the transfer of column vacancies from the selected region, such as region A', to another region, such as F', E', or D', of the active core of the reactor. In order to sweep the whole reactor core, as shown in FIG. 1, it is necessary to proceed from a given fuel region to another region which may be in any of the relative positions indicated. Referring to FIG. 3, if region A' is entered so that the three cross hatched fuel columns have six fuel elements removed, one has to be able to end with the three dotted columns in each of regions B', C', D', E' and F' in the same state. For reasons of symmetry, it is enough that Tables I, II and III list a plan to reach regions D', E' and F', as shown by solid arrows 36, 38 and 40.

With reference to Tables I, II and III, the various symbols used in the columns of the tables have the following meanings: The upper case letters, followed by a number, refer to column positions in the eight-layer core as designated in FIG. 3 with the primes omitted. The lower case letters, followed by a number, refer to corresponding column positions in the upper reflector region, it being understood that the upper reflector region comprises the upper reflector blocks disposed on the upper ends of the fuel columns 12 and control rod fuel columns 14, as is known.

The first column in each of Tables I, II and III gives the numerical order of movement in the scheme of axial shuffling. In the second column, the term MH mans to "move horizontally" the fuel elements 27 or rod blocks, while the term *mh* means to "move horizontally" the reflector blocks. The term MD means to move fuel elements down from the upper six to the lower six layers of the active core. The symbol S means to remove fuel elements to storage from the lower two layers of a column. The term A means to add fresh fuel elements to the upper end of six transferred fuel elements.

In the third column of the tables, the number set forth indicates the number of fuel elements of rod blocks to be moved, the term r indicates top reflectors on the fuel columns 12, and "R" means rod blocks or rod column reflectors. The fourth column in the tables, entitled "From", indicates the core column from which the fuel elements, rod blocks, or reflector blocks are removed or transferred in accordance with the command of column two. The fifth column in the tables, entitled "To", indicates the core column to which the fuel elements, rod blocks, or reflector blocks are transferred in accordance with the command of column two.

Column six in the tables indicates the status of the fuel-element or rod-block vacancies after each move called for in column two. Simple numbers mean that the top six layers are empty, sublineation means that all eight layers are empty, and a superlineation denotes that only the top two layers of a column are empty. For simplicity the primes have been omitted in these columns. A position in parentheses indicates a mismatch (for example, rod blocks in a noncentral position).

The seventh column of the tables indicates the status of reflector vacancies after the specific move of column 1. This therefore indicates the positions or places where a reflector block may be placed. Parentheses indicate a mismatch (for example, a rod block reflector being in a noncentral position).

A solid line across the tables indicates movement of the transfer machine employed in the shuffling scheme to a new position.

TABLE I

SHUFFLING OF FUEL IN REGION A', WITH TRANSFER OF COLUMN VACANCIES TO REGION F'

| No. | Operation | | From | To | Fuel Block Vacancies | Reflector Vacancies |
|---|---|---|---|---|---|---|
| 1 | S | 2 | A3 | | A2 A3 A7 | (g4) a1 |
| 2 | S | 2 | A7 | | A2 $\overline{A3}$A7 | |
| 3 | MH | 6R | A1 | A2 | (A2) $\overline{A1}$ $\overline{A3A7}$ | (g4) (a2) |
| 4 | mh | r | a6 | a2 | | (g4) (a2) a6 |
| 5 | S | 2H | A1 | | (A2) A1A3A7 | |
| 6 | MD | 6 | A6 | A7 | (A2) $\overline{A1A3A6}$ $\overline{A7}$ | (g4) (a2) |
| 7 | S | 2 | A6 | | (A2) $\overline{A1A3A6A7}$ | |
| 8 | A | 2 | | A7 | (A2) $\overline{A1A3A6}$ | (g4) (a2) a7 |
| 9 | mh | r | a5 | a7 | | (g4) (a2) a5 |
| 10 | MD | 6 | A5 | A6 | (A2) A1A3 A5 $\overline{A6}$ | (g4) (a2) |
| 11 | S | 2 | A5 | | (A2) $\overline{A1A3A5A6}$ | |
| 12 | A | 2 | | A6 | (A2) $\overline{A1A3A5}$ | (g4) (a2) a6 |
| 13 | mh | r | a4 | a6 | | (g4) (a2) a4 |
| 14 | MD | 6 | A4 | A5 | (A2) A1A3A4 $\overline{A5}$ | (g4) (a2) |
| 15 | S | 2 | A4 | | (A2) $\overline{A1A3A4A5}$ | |
| 16 | A | 2 | | A5 | (A2) $\overline{A1A3A4}$ | (g4) (a2) a6 |
| 17 | mh | r | e6 | a6 | | (g4) (a2) e6 |
| 18 | MD | 6 | E6 | A4 | (A2) A1A3$\overline{A4}$E6 | (g4) (a2) |
| 19 | A | 2 | | A4 | (A2) $\overline{A1A3}$E6 | (g4) (a2) a4 |
| 20 | mh | 2 | a2 | a4 | | (g4) a2 |
| 21 | MD | 6R | A2 | A1 | A2 $\overline{A1}$A3E6 | (g4) a1 |
| 22 | A | 2R | | A1 | A2 $\overline{A3E6}$ | |
| 23 | mh | r | g4 | a1 | | g4 |
| 24 | S | 2 | A2 | | $\underline{A2A3E6}$ | |
| 25 | mh | r | e7 | g4 | | e7 |
| 26 | MH | 6 | E7 | E6 | $\underline{A2A3}$E7 | e6 |
| 27 | mh | r | f5 | e6 | | f5 |
| 28 | MD | 6 | F5 | A3 | $\underline{A2A3}$E7 F5 | |
| 29 | A | 2 | | A3 | $\underline{A2}$E7 F5 | a3 |
| 30 | mh | r | f6 | a3 | | f6 |
| 31 | MD | 6 | F6 | A2 | $\underline{A2}$E7 F5 F6 | |
| 32 | A | 2 | | A2 | E7 F5 F6 | a2 |
| 33 | mh | r | f4 | a2 | | f4 |
| 34 | MH | 6 | F4 | E7 | $\overline{E7}$F5 F6 F4 | e7 |
| 35 | mh | rR | f1 | e7 | F5 F6 F4 | (e7) f1 |

TABLE II

SHUFFLING OF FUEL IN REGION A', WITH TRANSFER OF COLUMN VACANCIES TO REGION E'

| No. | Operation | | From | To | Fuel Block Vacancies | Reflector Vacancies |
|---|---|---|---|---|---|---|
| 1 | S | 2 | A7 | | A2 A3 A7 | (g4) a1 |
| 2 | S | 2 | A2 | | $\underline{A2A3}$ $\overline{A7}$ | |
| 3 | MH | 6R | A1 | A3 | $\overline{A2}$(A3) $\overline{A7}$A1 | (g4) a3 |
| 4 | S | 2R | A1 | | $\overline{A2}$(A3) $\overline{A7A1}$ | |
| 5 | mh | r | a6 | a3 | | (g4) (a3) a6 |
| 6 | MD | 6 | A6 | A2 | $\overline{A2}$(A3) $\overline{A7A1}$A6 | (g4) (a3) |
| 7 | A | | | A2 | (A3) $\overline{A7A1A6}$ | (g4) (a3) a2 |
| 8 | S | 2 | A6 | | (A3) $\overline{A7A1A6}$ | |
| 9 | mh | r | a5 | a2 | | (g4) (a3) a5 |
| 10 | MD | 6 | A5 | A7 | (A3) $\overline{A7A1A6}$A5 | |
| 11 | A | 2 | | A7 | (A3) $\overline{A1A6A5}$ | (g4) (a3) a7 |
| 12 | S | 2 | A5 | | (A3) $\overline{A1A6A5}$ | |
| 13 | mh | r | a4 | a7 | | (g4) (a3) a4 |
| 14 | MD | 6 | A4 | A6 | (A3) $\overline{A1A6A5}$A4 | (g4) (a3) |
| 15 | A | 2 | | A6 | (A3) $\overline{A1A5A4}$ | (g4) (a3) a6 |
| 16 | S | 2 | A4 | | (A3) $\overline{A1A5A4}$ | |
| 17 | mh | r | d7 | a6 | | (g4) (a3) d7 |
| 18 | MH | 6 | D7 | A5 | (A3) A1$\overline{A5}$A4D7 | (g4) (a3) |
| 19 | A | 2 | | A5 | (A3) $\underline{A1A4}$D7 | |
| 20 | MD | 6R | A3 | A1 | A3 A1$\overline{A4}$D7 | (g4) |
| 21 | A | 2R | | A1 | A3 $\underline{A4}$D7 | (g4) a1 |
| 22 | mh | r | g4 | a1 | | g4 |
| 23 | S | 2 | A3 | | $\underline{A3A4}$D7 | |
| 24 | mh | r | d2 | g4 | | d2 |
| 25 | MH | 6 | D2 | D7 | $\underline{A3A4}$D2 | d2 |
| 26 | mh | r | e6 | d2 | | e6 |

TABLE II-continued
SHUFFLING OF FUEL IN REGION A', WITH TRANSFER
OF COLUMN VACANCIES TO REGION E'

| No. | Operation | From | To | Fuel Block Vacancies | Reflector Vacancies |
|---|---|---|---|---|---|
| 27 | MD | 6 | E6 | A4 A3A4D2 E6 | |
| 28 | A | 2 | | A4 A̅3D2 E6 | a4 |
| 29 | mh | e7 | a4 | — | e7 |
| 30 | MD | 6 | E7 | A3 A̅3D2 E6 E7 | |
| 31 | A | 2 | | A3 D2 E6 E7 | a3 |
| 32 | mh | r | e5 | a3 | e5 |
| 33 | MH | 6 | E5 | D2 E6 E7 E5 | d2 |
| 34 | mh | rR | E1 | d2 | (d2) |

TABLE III
SHUFFLING OF FUEL IN REGION A', WITH TRANSFER
OF COLUMN VACANCIES TO REGION D'

| No. | Operation | From | To | Fuel Block Vacancies | Reflector Vacancies |
|---|---|---|---|---|---|
| | | | | A2 A3 A7 | (g4) a1 |
| 1 | S | 2 | A7 | A2 A3 A̅7 | |
| 2 | S | 2 | A2 | A2A3 A̅7 | |
| 3 | MH | 6R | A1 | A3 A̅2(A3) A̅7A1 | (g4) a3 |
| 4 | S | 2R | A1 | A̅2(A3) A̅7A1 | |
| 5 | mh | r | a6 | a3 | (g4) (a3) a6 |
| 6 | MD | 6 | A6 | A2 A̅2(A3) A̅7A1A6 | (g4) (a3) |
| 7 | A | | | A2 (A3) A̅7A̅1A6 | (g4) (a3) a2 |
| 8 | S | 2 | A6 | (A3) A̅7A̅1A6 | |
| 9 | mh | r | a5 | a2 | (g4) (a3) a5 |
| 10 | MD | 6 | A5 | A7 (A3) A̅7A1A6A5 | (g4) (a3) |
| 11 | A | 2 | | A7 (A3) A1A̅6A̅5 | (g4) (a3) a7 |
| 12 | S | 2 | A5 | (A3) A̅1A̅6A5 | |
| 13 | mh | r | a4 | a7 | (g4) (a3) a4 |
| 14 | MD | 6 | A4 | A6 (A3) A1A̅6A5A4 | (g4) (a3) |
| 15 | A | 2 | | A6 (A3) A̅1A̅5A̅4 | (g4) (a3) a6 |
| 16 | S | 2 | A4 | (A3) A̅1A̅5A̅4 | |
| 17 | mh | r | a3 | a6 | (g4) |
| 18 | MD | 6R | A3 | A1 A̅1A5A4A3 | |
| 19 | A | 2R | | A1 A̅5A̅4A̅3 | (g4) A1 |
| 20 | S | 2 | A3 | A̅5A̅4A̅3 | |
| 21 | mh | rR | g4 | a1 | g4 |
| 22 | mh | r | e6 | g4 | e7 |
| 23 | MD | 6 | E6 | A3 A5A4A̅3E6 | |
| 24 | A | 2 | | A3 A̅5A̅4E6 | a3 |
| 25 | mh | r | d7 | a3 | d7 |
| 26 | MD | 6 | D7 | A5 A̅5A4E6 D7 | |
| 27 | A | 2 | | A5 A4E̅6 D7 | a5 |
| 28 | mh | r | d2 | a5 | d2 |
| 29 | MD | 6 | D2 | A4 A̅4E6 D7 D2 | |
| 30 | A | 2 | | A4 | a4 |
| 31 | mh | r | e5 | a4 | E6 D7 D2 | e5 |
| 32 | MH | 6 | E5 | E6 D7 D2 E5 | e6 |
| 33 | mh | r | d3 | e6 | d3 |
| 34 | MH | 6 | D3 | E5 D7 D2 D3 | e5 |
| 35 | mh | rR | d1 | e5 | (e5) d1 |

It can be seen that a continuation of the scheme of movements as set forth in Tables I, II and III will effect shuffling of the fuel elements and rod blocks throughout the active core of the nuclear reactor 10. The tables show that it takes about 35 operations to refuel one region of the reactor core, and therefore 35 × 73 = 2540 operations for the whole reactor core 10 illustrated in FIG. 1.

It will be understood that upon completion of axial shuffling throughout the various regions of the active core of reactor 10 in accordance with the scheme set forth above in Tables I, II and III, any column vacancies then remaining will be filled with the upper six fuel elements from one of the fuel columns 12 which are initially vacated and two fresh fuel elements which will constitute the upper two layers of fuel elements.

As noted, the handling machine or mechanism for carrying out the method in accordance with the present invention does not constitute a part of the present invention and will not be described in detail herein. However, it will be appreciated that such handling machine must be capable of slight axial lifting of the fuel elements, moving the lifted fuel elements substantially laterally to another position, and lowering as a unit a partial column of six fuel elements when surrounded by up to four complete columns. The machine must be capable of lifting out from the top or upper end of the reactor core, either individually or in pairs, the bottom two spent fuel elements or rod blocks of a column when surrounded by up to six other fuel columns adjacent the column being worked on. The machine must further be capable of transferring two top reflector blocks from column to column over complete columns, this operation preferably being such that the two reflector blocks are move simultaneously.

The machine employed in carrying out the present invention must be capable of lifting a six fuel element or rod block column and overcoming any extra force that may be required to free the fuel elements or rod blocks from their neighbors, particularly along parallel surfaces. The machine should preferably be capable of grasping the lowermost fuel element or rod block in a six element column, while simultaneously grasping some of the upper elements or blocks in the column so that some of the lifting force is imparted to the upper as well as the lower fuel elements or rod blocks being lifted and transferred laterally. The above-tabulated scheme assumes that the machine is centered over a rod-column, such as A'1, and that it can reach to and operate upon columns once removed from that central column, i.e. to two nearest columns in each of the neighboring regions.

Thus, in accordance with the present invention, a method for axially shuffling fuel elements and rod blocks in a nuclear reactor is presented which does not require complete removal and reinsertion of all the fuel or rod elements after the spent fuel elements or rod blocks have been replaced with fresh fuel elements or rod blocks. All of the movements required in carrying out the method of the invention are accomplished from the upper end of the reactor core and with a minimum of head space between core and liner.

While one embodiment of the method for axially shuffling fuel elements and rod blocks in the active core of the nuclear reactor in accordance with the present invention has been illustrated and described, it will be obvious to those skilled in the art that changes and modifications may be made therein without departing from the invention in its broader aspects. Various features of the invention are set forth in the following claims.

What is claimed is:

1. A method of refueling the fuel columns in the active core of a nuclear reactor having upper and lower ends and including fuel columns comprised of substantially equal stacks of fuel elements having hexagonal transverse configurations, said method comprising the steps of:
   a. completely removing a predetermined number of adjoining fuel columns to initially create a plurality of adjoining vacant columns;
   b. filling one of said vacant columns with at least one fresh hexagonal shaped fuel element, and a plurality of complementary hexagonal shaped fuel elements transferred from a single fuel column adjoining at least one of said vacant columns by laterally transferring said plurality of complementary fuel elements as a unit to said one of said vacant columns through adjoining column vacancies by substantially lateral movement so as to maintain their same relative stack positions during said transferring and without lifting or lowering the major portion of any of said fuel elements beyond the upper or lower bounds of the active core during said transferring;

c. discarding a number of fuel elements from said single adjoining fuel column equal to the number of said fresh fuel elements placed in said one of said vacant columns to thus create a new vacant column;

d. repeating steps b and c until all of said fuel columns in said active core have been refueled except a number of finally remaining vacant columns equal to the number of initially created vacant columns; and e. refilling said remaining vacant columns with a number of hexagonal shaped fuel elements as necessary to establish full fuel columns.

2. The method of claim 1 wherein the fuel elements of at least two adjoining fuel columns are removed to initially create at least two adjoining vacant columns, and wherein said new vacant column created in step (c) is located adjoining the remaining ones of said initially created adjoining vacant columns.

3. The mthod as defined in claim 1 wherein said complementary fuel elements are placed in said one of said vacant columns prior to placing said fresh fuel elements therein such that said fresh fuel elements are placed in top column positions, said fuel elements discarded from said adjoining fuel column being taken from the bottom positions of said adjoining fuel column.

4. The method as defined in claim 1 wherein said fresh fuel elements are placed in bottom positions in said one of said vacant columns, and said fuel elements discarded from said adjoining fuel column are taken from the top positions of said adjoining fuel column.

5. The method as defined in claim 1 wherein in alternate fuel columns, said fresh fuel elements are placed in top and bottom positions of their corresponding vacant columns, said discarded fuel elements being taken alternately from bottom and top positions of said corresponding adjoining columns.

6. The method of claim 1 wherein said steps are accomplished from the upper end of said reactor core.

7. The method as defined in claim 1 wherein said fuel elements are disposed in substantially vertically stacked relation, each of said fuel columns comprising eight fuel elements, said step of transferring a complementary number of fuel elements comprising the transfer of six of the uppermost fuel elements from the transferor column, said step of discarding fuel elements from the transferor column comprising removing and discarding the two lowermost fuel elements in said transferor column.

8. The method as defined in claim 1 wherein said step of completely removing a predetermined number of adjoining fuel columns to initially create adjoining column vacancies comprises removing three adjoining columns.

9. A method of refueling the active core of a nuclear reactor wherein the active core includes a plurality of fuel columns and a plurality of rod columns, each of said fuel columns being disposed in generally vertical relation and including eight stacked fuel elements having hexagonal transverse configurations, each of said rod columns being disposed in generally vertical relation and including eight stacked rod blocks having hexagonal transverse configurations, said rod blocks being of substantially equal size and peripheral configuration to said fuel elements, said rod columns and said fuel columns defining fuel zones each of which includes one of said rod columns in substantially full peripheral surface contacting relation with surrounding adjoining fuel columns, said method comprising the steps of:

a. totally removing three adjoining fuel columns to initially create adjoining column vacancies;

b. transferring as a unit six of the fuel elements from a transferor column adjoining two of said vacant columns into one of said adjoining vacant columns by substantially lateral shuffling movement through column vacancies without lifting or lowering the major portion of any of said fuel elements beyond the upper or lower bounds of the active core;

c. adding two fresh fuel elements to the upper end of the six fuel elements transferred to said on of said vacant columns to provide a full complement of fuel elements in the newly filled fuel column and effect top layer refueling of said newly filled fuel column;

d. removing the two lowermost remaining fuel elements from said transferor column to create a new column vacancy therein adjoining at least one of said previously created vacancies;

e. repeating steps (b) through (d) until the fuel elements of all of said fuel columns in said active core have been shuffled except the fuel elements of said three initially removed fuel columns; and f. refilling any remaining column vacancies after effecting said shuffling with six of the uppermost fuel elements removed from an initially vacated fuel column and two upper hexagonal shaped fresh fuel elements, whereby at least one-fourth of the fuel elements initially in said active core are removed, and at least one-fourth of the elements disposed in said active core after said refueling comprise fresh fuel elements.

10. The method of claim 9 including the steps of placing a predetermined number of upper rod blocks from one of said rod columns in a park position as necessary to allow said lateral movement of said stacked fuel elements within a particular fuel zone while leaving a predetermined number of lower rod blocks in said rod column, removing the rod blocks remaining in said one of said rod columns from said active core, replacing said parked rod blocks into said one of said rod columns after completing transfer of said fuel elements within said particular fuel zone, and adding fresh rod blocks to the upper end of said replaced rod blocks to provide a full complement of rod blocks in said rod column, and repeating said steps in respect to said rod blocks as necessary until all of the fuel zones within said active core have been refueled.

* * * * *

UNITED STATES PATENT AND TRADEMARK OFFICE
CERTIFICATE OF CORRECTION

PATENT NO. : 4,040,902
DATED : August 9, 1977
INVENTOR(S) : Karol J. Mysels

It is certified that error appears in the above—identified patent and that said Letters Patent are hereby corrected as shown below:

| | |
|---|---|
| Col. 1, line 40 | "distrub" should be --disturb--. |
| Col. 2, line 64 | "non-critically" should be --non-criticality--. |
| Col. 3, line 12 | "new" should be --net--. |
| Col. 3, line 42 | "elements" should be --element--. |
| Col. 4, line 55 | "considertion" should be --consideration--. |
| Col. 5, line 7 | The comma (,) after "28c" should be a period (.). |
| Col. 5, line 20 | "reator" should be --reactor--. |
| Col. 5, lines 27-28 | "transfer" should be --transferor--. |
| Col. 6, line 13 | Open quotation marks appear backwards in the quoted passage "upward axial push-through" |
| Col. 6, line 50 | "necessry" should be --necessary--. |
| Col. 7, line 41 | "mans" should be --means--. | continued..

UNITED STATES PATENT AND TRADEMARK OFFICE
CERTIFICATE OF CORRECTION

PATENT NO. : 4,040,902
DATED : August 9, 1977
INVENTOR(S) : Karol J. Mysels

It is certified that error appears in the above–identified patent and that said Letters Patent are hereby corrected as shown below:

Continued:

Col. 8, TABLE I     A solid line should extend horizontally across the table following "32" in the "No." column to indicate movement of the transfer machine employed in the shuffling scheme to a new position.

Col. 8, TABLE II     Insert --(g4) (a3)-- in the horizontal line of "No. 10" under the column "Reflector Vacancies".

Col. 9, TABLE II     A solid line should extend horizontally across the table following "31" in the "No." column to indicate movement of the transfer machine to a new position.

Col. 9, TABLE III     A solid line should extend horizontally across the table following "30" in the "No." column to indicate movement of the transfer machine to a new position.

Col. 9, line 58     "are" should be --were--.

Col. 10, line 10     "move" should be --moved--.

Col. 11, line 23     "mthod" should be --method--.

continued..

UNITED STATES PATENT AND TRADEMARK OFFICE
CERTIFICATE OF CORRECTION

PATENT NO. : 4,040,902
DATED : August 9, 1977        Page 3 of 3
INVENTOR(S) : Karol J. Mysels It is certified that error appears in the above—identified patent and that said Letters Patent are hereby corrected as shown below:

Continued :

Col. 12, lines
18 and 19          "through column vacancies" should be --through adjoining column vacancies--.

Col. 12, line 22    "on" should be --one--.

Signed and Sealed this

Twenty-ninth Day of November 1977

[SEAL]

Attest:

RUTH C. MASON
Attesting Officer

LUTRELLE F. PARKER
Acting Commissioner of Patents and Trademarks